(12) United States Patent
Parks et al.

(10) Patent No.: US 9,409,193 B2
(45) Date of Patent: Aug. 9, 2016

(54) DUAL COMPONENT DISPENSING AND MIXING SYSTEMS FOR MARINE AND MILITARY PAINTS

(71) Applicant: SULZER MIXPAC AG, Haag (CH)

(72) Inventors: Richard Parks, Stafford, VA (US); Heather Parks, South Riding, VA (US)

(73) Assignee: SULZER MIXPAC AG, Haag (CH)

( * ) Notice: Subject to any disclaimer, the term of this patent is extended or adjusted under 35 U.S.C. 154(b) by 209 days.

(21) Appl. No.: 14/194,193

(22) Filed: Feb. 28, 2014

(65) Prior Publication Data

US 2015/0306613 A1   Oct. 29, 2015

Related U.S. Application Data

(60) Division of application No. 12/897,362, filed on Oct. 4, 2010, now Pat. No. 8,668,399, which is a continuation of application No. 11/563,791, filed on Nov. 28, 2006, now Pat. No. 7,815,384, which is a continuation of application No. 11/003,449, filed on Dec. 6, 2004, now Pat. No. 7,144,170.

(60) Provisional application No. 60/551,200, filed on Mar. 8, 2004, provisional application No. 60/533,973, filed on Jan. 2, 2004.

(51) Int. Cl.
| | |
|---|---|
| *B05B 7/26* | (2006.01) |
| *B01F 5/06* | (2006.01) |
| *B05C 17/005* | (2006.01) |
| *B05B 7/24* | (2006.01) |
| *B05C 17/015* | (2006.01) |
| *B05C 17/03* | (2006.01) |
| *B05C 17/035* | (2006.01) |
| *B05D 1/34* | (2006.01) |

(52) U.S. Cl.
CPC ............... *B05B 7/26* (2013.01); *B01F 5/0615* (2013.01); *B05B 7/2405* (2013.01); *B05B 7/2472* (2013.01); *B05C 17/0052* (2013.01); *B05C 17/00513* (2013.01); *B05C 17/00553* (2013.01); *B05C 17/015* (2013.01); *B05C 17/035* (2013.01); *B05C 17/0308* (2013.01); *B05C 17/0325* (2013.01); *B01F 2215/005* (2013.01); *B01F 2215/0039* (2013.01); *B05D 1/34* (2013.01)

(58) Field of Classification Search
CPC combination set(s) only.
See application file for complete search history.

(56) References Cited

U.S. PATENT DOCUMENTS

| | | |
|---|---|---|
| 2,504,487 A | 4/1950 | Anson |
| 2,511,627 A | 6/1950 | Einbecker |

(Continued)

OTHER PUBLICATIONS

Answer to Complaint with Affirmative Defenses with Jury Demand, Counterclaim against Richard Parks Corrosion Tech Inc. By Jason Baker, V.O. Baker Co., Inc., Thomas Baker, May 19, 2010, from *Richard Parks Corrosion Tech., Inc. v. Plas-Pak Indus. Inc. et al.*, Civil Action No. 3:10-cv-00437-WWE (District of Connecticut).

(Continued)

*Primary Examiner* — David Walczak
(74) *Attorney, Agent, or Firm* — Global IP Counselors, LLP

(57) ABSTRACT

A device for applying a spray coating includes at least two component cartridge, each including an aperture in fluid communication with a static mixing nozzle, and at least one paint applicator comprising a spray tip in fluid communication with the static mixing nozzle. At least one flexible hose is disposed between and in fluid communication with the spray tip and the static mixing nozzle.

21 Claims, 10 Drawing Sheets

(56) References Cited

U.S. PATENT DOCUMENTS

| | | | |
|---|---|---|---|
| 3,166,221 | A | 1/1965 | Nielsen |
| 3,451,593 | A | 6/1969 | Dillarstone |
| 3,828,980 | A | 8/1974 | Creighton et al. |
| 3,847,112 | A | 11/1974 | Wise |
| 3,936,199 | A | 2/1976 | Zimmermann |
| 3,989,228 | A | 11/1976 | Morris et al. |
| 4,538,920 | A | 9/1985 | Drake |
| 4,745,011 | A | 5/1988 | Fukuta et al. |
| 4,767,026 | A | 8/1988 | Keller et al. |
| 4,840,493 | A | 6/1989 | Horner |
| 4,850,705 | A | 7/1989 | Horner |
| 5,033,650 | A | 7/1991 | Colin et al. |
| 5,072,862 | A | 12/1991 | Keller |
| 5,174,653 | A | 12/1992 | Halat et al. |
| 5,249,709 | A | 10/1993 | Duckworth et al. |
| 5,310,091 | A | 5/1994 | Dunning et al. |
| 5,496,123 | A | 3/1996 | Gaither |
| 5,535,922 | A | 7/1996 | Maziarz |
| 5,686,507 | A | 11/1997 | Hermele et al. |
| 5,713,095 | A | 2/1998 | Wakat |
| 5,725,499 | A | 3/1998 | Silverstein et al. |
| 5,875,928 | A | 3/1999 | Müller et al. |
| 6,099,160 | A | 8/2000 | Flackett |
| 6,135,631 | A | 10/2000 | Keller |
| 6,241,125 | B1 | 6/2001 | Jacobsen et al. |
| 6,244,740 | B1 | 6/2001 | Wagner et al. |
| 6,484,904 | B1 | 11/2002 | Horner et al. |
| 6,505,983 | B1 | 1/2003 | Seo |
| 6,601,782 | B1 | 8/2003 | Sandholm et al. |
| 6,629,774 | B1 | 10/2003 | Gruendeman |
| 6,632,860 | B1 | 10/2003 | Hansen et al. |
| 6,672,519 | B2 | 1/2004 | Hunter et al. |
| 6,764,026 | B2 | 7/2004 | Hunter et al. |
| 6,769,578 | B1 | 8/2004 | Ciofalo et al. |
| 6,773,156 | B2 | 8/2004 | Henning |
| 7,168,877 | B2 | 1/2007 | Park |
| 7,918,369 | B2 * | 4/2011 | Kosmyna ............... B05B 7/0408 222/105 |
| 2001/0030241 | A1 | 10/2001 | Kott et al. |
| 2002/0110682 | A1 | 8/2002 | Brogan |
| 2002/0170982 | A1 | 11/2002 | Hunter |
| 2003/0048694 | A1 | 3/2003 | Horner et al. |

OTHER PUBLICATIONS

Complaint against Thomas Baker, Jason Baker, Plas-Pak Indus Inc., V.O. Baker Co. Inc. filed by Richard Parks Corrosion Tech Inc., Mar. 22, 2010, from *Richard Parks Corrosion Tech., Inc.* v. *Plas-Pak Indus. Inc. et al.*, Civil Action No. 3:10-cv-00437-WWE (District of Connecticut).
Corporate Disclosure Statement by Plas-Pak Indus Inc. May 24, 2010, from *Richard Parks Corrosion Tech., Inc.* v. *Plas-Pak Indus. Inc. et al.*, Civil Action No. 3:10-cv-00437- WWE (District of Connecticut).
Corporate Disclosure Statement by Richard Parks Corrosion Tech Inc. Mar. 22, 2010, from *Richard Parks Corrosion Tech., Inc.* v. *Plas-Pak Indus. Inc. et al.*, Civil Action No. 3:10-cv-00437-WWE (District of Connecticut).
Corporate Disclosure Statement by V.O. Baker Co. Inc. May 19, 2010, from *Richard Parks Corrosion Tech., Inc.* v. *Plas-Pak Indus. Inc. et al.*, Civil Action No. 3:10-cv-00437-WWE (District of Connecticut).
Decision on Appeal dated Jul. 1, 2013 for U.S. Pat. No. 7,144,170, Control No. 95/001,371.
Examiner's Answer dated Aug. 14, 2012 for U.S. Pat. No. 7,144,170, Control No. 95/001,371.
Examiner's Answer dated Dec. 12, 2012 for U.S. Pat. No. 7,815,384, Control No. 95,001,656.
Final Office Action dated Feb. 12, 2013 for U.S. Appl. No. 12/897,362, a continuation of U.S. Pat. No. 7,815,384 and 7,144,170.
Litigation Docket dated Jan. 17, 2012, from *Richard Parks Corrosion Tech., Inc.* v. *Plas-Pak Indus. Inc. et al.*, Civil Action No. 3:10-cv-00437-WWE (District of Connecticut).

"Manufacturers of Single and Dual Component Plastic Syringes, Cartridges, Static Mixers, Delivery Systems, Human and Veterinary Health Care Packaging," Plas-Pak Industries, Inc., Retrieved Oct. 8, 2004, <http://www.plaspakinc.com/about.htm>.
Mottram, D., "Interesting Applications of Two Component Cartridges." TAH Industries, Inc., Nov. 5, 2002.
Non-Final Office Action dated Aug. 15, 2011 for U.S. Pat. No. 7,815,384, Control No. 95,001,656.
Non-Final Office Action dated Jul. 18, 2012 for U.S. Appl. No. 12/897,362, a continuation of U.S. Pat. No. 7,815,384 and 7,144,170.
Non-Final Office Action Mailed Aug. 24, 2010 in Inter Partes Reexamination of U.S. Pat. No. 7,144,170, Control No. 95/001,371.
Notice of Appeal—Requester dated Jan. 13, 2012 for U.S. Pat. No. 7,144,170, Control No. 95/001,371.
Notice of Appeal—Requester dated May 11, 2012 for U.S. Pat. No. 7,815,384, Control No. 95/001,656.
Order Mailed Aug. 24, 2010 Granting Request for *Inter Partes* Reexamination of U.S. Pat. No. 7,144,170, Control No. 95/001,371.
Order on Pretrial Deadlines, Mar. 22, 2010, from *Richard Parks Corrosion Tech., Inc.* v. *PlasPak Indus. Inc. et al.*, Civil Action No. 3:10-cv-00437-WWE (District of Connecticut).
Patent Owner's Respondent Brief dated Apr. 9, 2012 for U.S. Pat. No. 7,144,170, Control No. 95/001,371.
Patent Owner's Respondent Brief dated Aug. 9, 2012 for U.S. Pat. No. 7,815,384, Control No. 95/001,656.
Plas-Pak Industries, Inc.'s Answer to Complaint with Affirmative Defenses with Jury Demand, Counterclaim against Richard Parks Corrosion Tech Inc. by Plas-Pak Inc. May 28, 2010, from *Richard Parks Corrosion Tech., Inc.* v. *Plas-Pak Indus. Inc. et al.*, Civil Action No. 3:10-cv-00437-WWE (District of Connecticut).
"Ratio-Pak HSS Spray System," Plas-Pak Industries, Inc. Retrieved Dec. 3, 2004 <http://www.plaspakinc.com/hss.htm>.
Rebuttal Brief of Plas-Pak dated Jan. 11, 2013 for U.S. Pat. No. 7,815,384, Control No. 95/001,656.
Report of Rule 26(f) Planning Meeting Jun. 7, 2010, from *Richard Parks Corrosion Tech., Inc.* v. *Plas-Pak Indus. Inc. et al.*, Civil Action No. 3:10-cv-00437-WWE (District of Connecticut).
Request for *Inter Partes* Reexamination of U.S. Pat. No. 7,144,170 submitted Jun. 7, 2010.
Response by Patent Owner to Office Action in *Inter Partes* Reexamination Oct. 25, 2010 for U.S. Pat. No. 7,144,170, Control No. 95/001,371.
Response re Answer to Complaint, Counterclaim filed by Richard Parks Corrosion Tech Inc. Jun. 8, 2010, from *Richard Parks Corrosion Tech., Inc.* v. *Plas-Pak Indus. Inc. et al.*, Civil Action No. 3:10-cv-00437-WWE (District of Connecticut).
Response re Answer to Complaint, Counterclaim filed by Richard Parks Corrosion Tech Inc. Jun. 16, 2010, from *Richard Parks Corrosion Tech., Inc.* v. *Plas-Pak Indus. Inc. et al.*, Civil Action No. 3:10-cv-00437-WWE (District of Connecticut).
Response to Office Action by Patent Owner in Inter Partes Reexamination of U.S. Pat. No. 7,815,384, Control No. 95/001,656, Under 37 C.F.R. 1.945 dated Oct. 17, 2011.
Third Party Requester Appeal Brief dated Jul. 10, 2012 for U.S. Pat. No. 7,815,384, Control No. 95/001,656.
Third Party Requester Appeal Brief dated Mar. 9, 2012 for U.S. Pat. No. 7,144,170, Control No. 95/001,371.
Third Party Requester Comments Under 37 C.F.R §1.947, Nov. 23, 2010 for U.S. Pat. No. 7,144,170, Control No. 95/001,371.
Third Party Requester Comments Under 37 C.F.R. 1.945 dated Nov. 15, 2011, in the *Inter Partes* Reexamination of U.S. Pat. No. 7,815,384, Control No. 95/001,656.
Third Party Requester's Request for Rehearing dated Jul. 30, 2013 for U.S. Pat. No. 7,144,170, Control No. 95/001,371.
Transmittal and Order Granting Request for *Inter Partes* Reexamination of U.S. Pat. No. 7,815,384, Control No. 95/001,656. Mail date Aug. 15, 2011.
Transmittal Form and Request for *Inter Partes* Reexamination of U.S. Pat. No. 7,815,384. Control No. 95/001,656, Mail date Jun. 13, 2011.
Transmittal of Communication to Third Party Requester *Inter Partes* Reexamination dated Dec. 14, 2011 enclosing Action Closing Prosecution for U.S. Pat. No. 7,815,384, Control No. 95/001,656.

(56) References Cited

OTHER PUBLICATIONS

Transmittal of Communication to Third Party Requester *Inter Partes* Reexamination mailed Dec. 15, 2011 for U.S. Pat. No. 7,144,170, Control No. 95/001,371.
Transmittal of Communication to Third Party Requester *Inter Partes* Reexamination dated Aug. 4, 2011 enclosing Action Closing Prosecution for U.S. Pat. No. 7,144,170, Control No. 95/001,371.
Notice Electing to Participate in the Appeal to the Federal Court in U.S. Pat. No. 7,144,170, Control No. 95/001,371, dated Mar. 26, 2014.
Third Party Requester's Notice of Appeal to the United States Court of Appeals for the Federal Circuit in U.S. Pat. No. 7,144,170, Control No. 95/001,371, dated Mar. 13, 2014.
Decision on Request for Rehearing in U.S. Pat. No. 7,144,170, Control No. 95/001,371, mailed Jan. 21, 2014.
Patent Owner's Comments on Third Party Requester's Request for Rehearing in U.S. Pat. No. 7,144,170, Control No. 95/001,371, dated Aug. 29, 2013.
Patent Trial and Appeal Board Docketing Notice for U.S. Pat. No. 7,144,170, Control No. 95/001,371, dated Nov. 18, 2012.
Record of Oral Hearing United States Patent and Trademark Office Before the Patent Trial and Appeal Board Richard Parks Corrosion Technologies, Inc. Plas-Pak Industries, Inc., Oral Hearing Held Oct. 23, 2013 for U.S. Pat. No. 7,815,384, Control No. 95/001,656.
Notice Electing to Participate in the Appeal to the Federal Circuit—Owner dated Mar. 26, 2014, for U.S. Pat. No. 7,815,384, Control No. 95/001,656.
Decision on Appeal dated Jan. 17, 2014, for U.S. Pat. No. 7,815,384, Control No. 95/001,656.
Confirmation of Hearing for U.S. Pat. No. 7,815,384, Control No. 95/001,656 dated Aug. 28, 2013.
Notice of Hearing dated Aug. 8, 2013, for U.S. Pat. No. 7,815,384, Control No. 95/001,656.
Patent Trial and Appeal Board Docketing Notice, dated Jun. 11, 2013, for U.S. Pat. No. 7,815,384, Control No. 95/001,656.
Request for Oral Hearing dated Feb. 11, 2013, for U.S. Pat. No. 7,815,384, Control No. 95/001,656.

\* cited by examiner

DUAL COMPONENT DISPENSING AND MIXING SYSTEMS FOR MARINE AND MILITARY PAINTS

PRIORITY CLAIM

This application is a divisional of U.S. Ser. No. 12/897,362 now U.S. Pat. No. 8,668,399, filed Oct. 4, 2010, which is a continuation of U.S. Ser. No. 11/563,791, filed Nov. 28, 2006, now U.S. Pat. No. 7,815,384, which is a continuation of U.S. Ser. No. 11/003,449, filed Dec. 6, 2004, now U.S. Pat. No. 7,144,170, which claims priority to U.S. Provisional Application Ser. No. 60/551,200, filed Mar. 8, 2004 and 60/533,973, filed Jan. 2, 2004, the entire contents of each of which are hereby incorporated by reference.

BACKGROUND OF THE INVENTION

1. Field of the Invention

This invention relates to multi-component dispensing and mixing systems for paints and coatings. More particularly, the present invention relates to devices and methods for packaging, mixing, and dispensing multi-component paints.

2. Related Art

U.S. Pat. No. 5,249,709 discloses cartridges for dispensing reactive materials in predetermined ratios. U.S. Pat. No. 5,072,862 discloses static flow mixers for use in dual cartridges, U.S. Pat. No. 4,538,920 discloses a dual cartridge with a static mixer in the nozzle. U.S. Pat. No. 4,767,026 discloses dual cartridge dispensing and mixing apparatus. U.S. Pat. No. 6,135,631 discloses a static mixer and nozzle for a multiple component dispensing cartridge having at least two cylinders. U.S. Pat. No. 5,535,922 discloses a caulking gun dispenser device, which allows one to use a multi-component cartridge dispenser in a regular caulking gun. U.S. Pat. No. 5,875,928 discloses a two-plunger dispensing gun suitable for mixing and discharging two-component compositions. U.S. Pat. No. 6,244,740 discloses a mixer for multi-component cartridges. U.S. Pat. No. 3,166,221 discloses a plastic, double-tube dispensing container. U.S. Pat. No. 3,828,980 discloses a dual cartridge dispenser. U.S. Pat. No. 6,601,782 discloses a disposable spray nozzle assembly.

BACKGROUND OF THE TECHNOLOGY

The use of high solids coatings is becoming increasingly popular. In the 1970's, regulatory bodies such as the Environmental Protection Agency (EPA) and the California Air Resource Board (CARB) began to scrutinize the paint and coating industries to reduce the amount of Volatile Organic Compounds (VOCs) released into the atmosphere. The regulatory bodies discovered that the solvents contained within paints were contributors to air pollution. The VOCs, which are released as the solvent evaporates from a painted surface during cure, react with nitrogen oxides to form ozone. As a result, the Clean Air Act (CAA) was developed by the EPA to regulate policies concerning the release of large amounts of VOCs into the atmosphere in an attempt to prevent further damage to the environment.

Each year coating application regulations reduce the amount of allowable VOC emissions released from coatings into the atmosphere. The military has begun specifying traditional solvent-based coatings and high solids, edge retentive coatings for construction and repair. These coatings were the government's solution to service life extension and reduced life cycle cost goals while at the same time addressing the tightening regulations. However, with the introduction of this new coating technology, new processes and handling requirements, unfamiliar to painters, were also introduced.

Multi-component, high solids paints cure by a chemical reaction that creates heat after mixing. With the small amount of solvent content, VOCs are greatly reduced, and the coatings provide a higher level of performance. These types of coatings have a much higher viscosity than traditional solvent-based systems, making them very difficult to apply. If the coatings are manually mixed and applied, the pot life of the mixture is shortened dramatically, often as short as 30 minutes and some measured on the order of seconds. Application environment and ratio control have more effect on these coatings than traditional coatings. Pot life, viscosity and curability are all dependent at least in part on temperature and humidity. Painters and supervisors need to continuously monitor these variables to produce the best product, which leads to increased costs.

SUMMARY OF THE INVENTION

The present invention solves the above problems, and others.

One embodiment of the present invention provides a device for applying a coating, which includes:
a multi-component cartridge,
a static mixing nozzle in fluid communication with the cartridge, and
at least one paint applicator selected from the group including a roller, a
brush, and an angled spray tip, in fluid communication with the nozzle.

Another embodiment of the invention provides a method, which includes applying a coating to a surface with the above-described device.

Another embodiment of the invention provides a method, which includes applying a non-skid coating to a surface with the above-described device.

BRIEF DESCRIPTION OF THE FIGURES

The following description will be better understood when read in conjunction with the appended drawings. For the purpose of illustrating the invention, there is shown in the drawings some embodiments which are presently preferred, it being understood, however, that this invention is not limited to the precise arrangements and instrumentalities shown.

DETAILED DESCRIPTION OF THE INVENTION

Various other objects, features, and attendant advantages of the present invention will be more fully appreciated as the same becomes better understood from the following detailed description of the invention, which is not intended to be limiting unless otherwise indicated.

The invention provides a multi-component industrial paint packaging system for use in simultaneously dispensing, mixing, brushing, rolling or spraying liquid coatings in one easy step. Preferably, the coatings are multi-component, reactive, high-solids low-VOC paints. More preferably, the coatings are multi-component, reactive, high-solids low-VOC marine, military, and industrial paints. The present invention desirably allows one to dispense, mix, roll, or spray two component marine and industrial paints in one continuous step without having to pre-mix either component. It also allows dispensing of the exact amount of marine, military, and industrial paints while reducing or eliminating the mixer's or painter's exposure to unnecessary hazardous materials, reduces the amount of hazardous waste in application, disposal and clean up, and reduces the amount of VOC's released into the environment. The invention is particularly suitable for large-scale industrial applications because it enables significant and unexpected savings of both material and labor, which translates into significant cost savings. The invention eliminates the need for packaging paints in one and five gallon cans, eliminates the need to open and premix paints, eliminates the need to manually pre-measure paints into exact ratios for use, significantly reduces waste and generation of excess paint associated with conventional methods, and provides a direct delivery method for marine and industrial paint by rolling, brushing, spraying, or power rolling the paint onto the surface to be painted. For example, in the course of industrial or commercial painting on a large scale, the paint composition is often continually transferred from large containers to smaller containers to avoid mixing more paint than needed and to reduce the carry burden of the individual painter.

Figure 1:
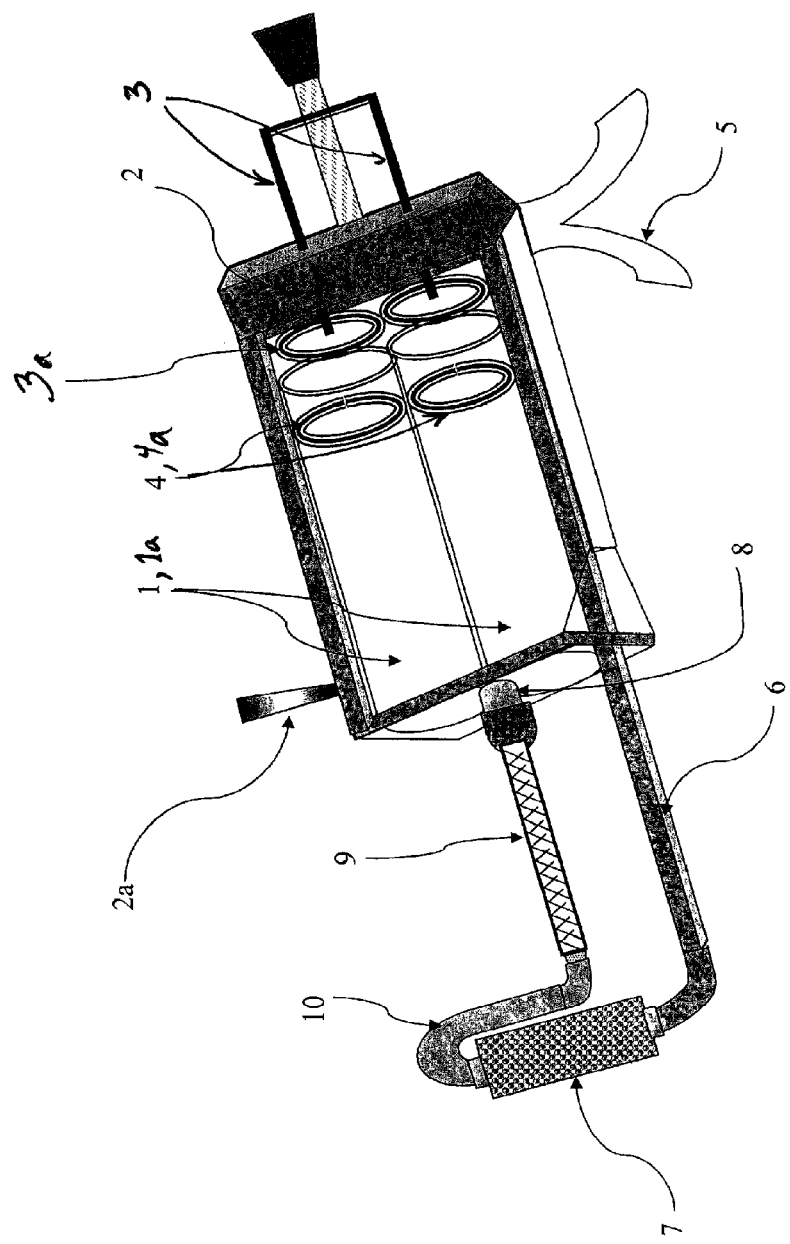
FIG. 1 shows the general parts of a preferred embodiment of the present invention.

FIG. 1 shows one preferred embodiment of the present invention. This embodiment includes a power roller, and the reactive paint components are desirably kept separate from one another and away from the atmosphere until immediately before use, when they are intimately mixed and fed to the roller for direct application. FIG. 1 shows a manual dispensing gun 2 and multi-component cartridges 1 and 1a. The cylindrical multi-component cartridges 1, 1a have respective cross sectional volumes that are proportional to predetermined mixing ratios. Each cartridge preferably contains one component of a multi-component coating, and thus the respective reactive components (for example a coating resin and catalyst) remain separate until mixing through a static mixer nozzle 9, and dispensed through a roller 7, which in this embodiment is a perforated or bleed through roller.

In this embodiment, a manual dispensing gun 2 is shown. During operation, piston rods 3 attached to piston plates 3a exert a force sufficient to push the piston plates 3a and cartridge piston seals 4, 4a simultaneously through the multi-component cylindrical cartridges 1, 1a, which force ejects their respective contents, the reactive components. The reactive paint components flow through a common discharge nozzle 8 and into the static mixing nozzle 9, where they contact one another. The reactive components are intimately mixed with one another as they flow through the static mixing nozzle 9.

In this embodiment, manual dispensing is initiated and controlled by a trigger system 5. The dispensing gun optionally has a handle 2a for the user to hold onto the dispenser while rolling the coating onto the work surface. The mixed paint is fed from the static mixing nozzle 9 into a discharge tube 10 that feeds the mixed coating material into the roller 7 for direct application to the work piece. The manual dispensing gun 2 has a support arm 6 attached to it, which supports the roller attachment 7.

The reactive components are ejected from their respective cartridges into the static mixing nozzle 9 in a ratio determined by the respective cross-sectional areas of the cartridges I and I a. In this way, the reactive components are thoroughly mixed and in the correct proportion, and thus two sources of potential error are avoided, in contrast with conventional mixing and formulating procedures. In addition, in one preferred embodiment, any or all of the roller 7, static mixer 9, and discharge tube 10 are disposable, being the only components that contact the mixed paint, so time-consuming and wasteful solvent cleaning is not necessary. The cartridges I and I a may either be resealed for future use if some remains or, if none remains, they may be disposed of as well.

Figure 2:
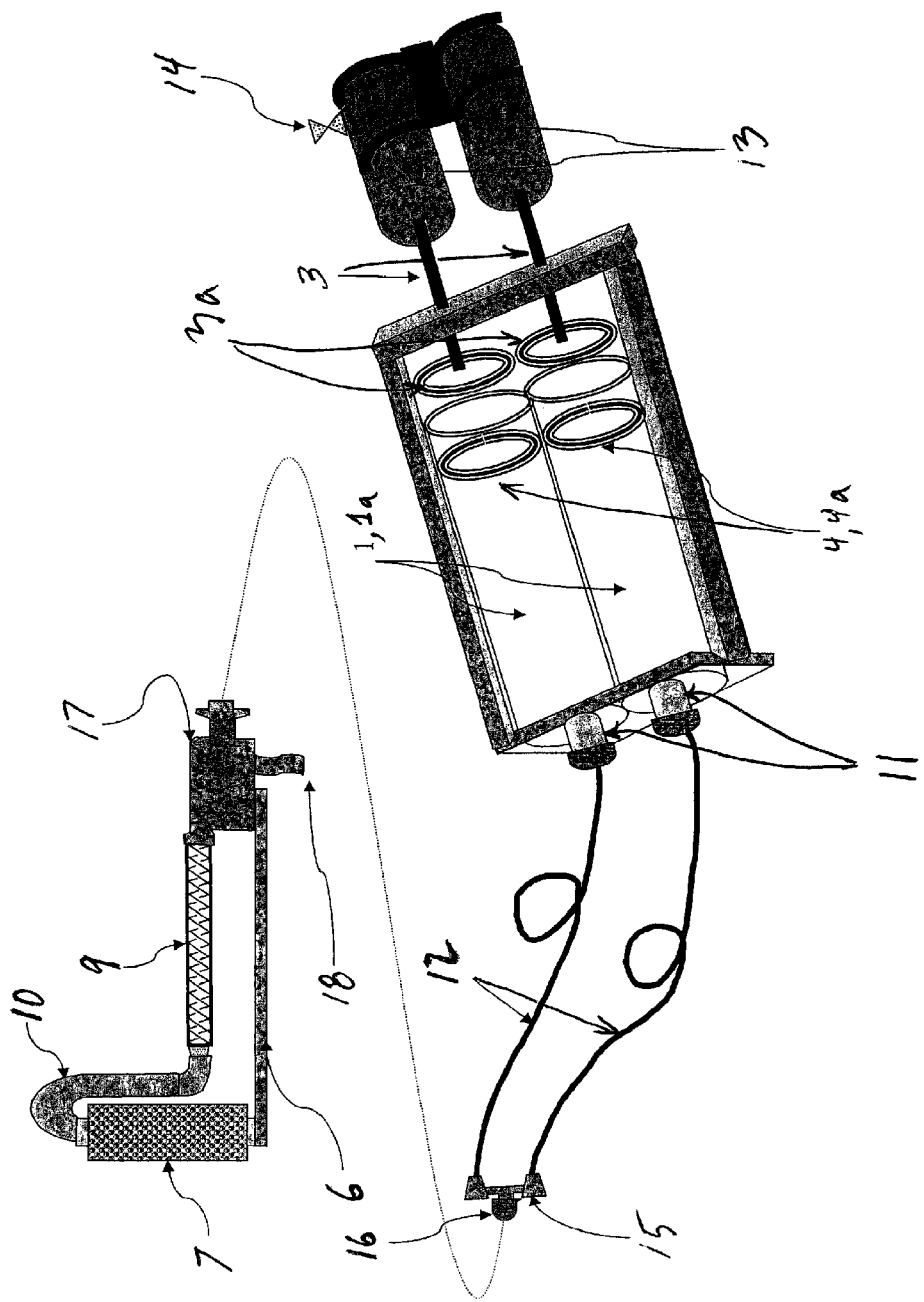
FIG. 2 shows the general parts of a preferred embodiment of the present invention.

Another preferred embodiment of the present invention is illustrated in FIG. 2, wherein the reactive paint components are ejected from the multi-component cartridges 1, 1 a with pneumatic or hydraulic force through individual dispensing apertures 11 and into and through hoses 12 to a remote roller applicator 17 that includes a power roller-type system for direct and continuous rolling. In this embodiment, pneumatic or hydraulic pumps 13 drive the piston rods 3, which apply continuous pressure on the cartridge piston seals 4, 4a for a continuous supply of paint to the roller 7. The pneumatic pump has an air regulator 14 that regulates the air pressure applied to the piston rods.

The twin hoses 12 attach to a coupler 15. The coupler 15 has a securing nut 16 to attach it and thus the hoses 12 to the remote roller applicator 17. The length of the hoses 12 may vary according to need. The remote roller applicator 17 has a trigger 18 that allows an operator to activate the pumps 13 and dispense and apply the mixed paint on demand and as needed. In the remote roller applicator, the reactive paint components are mixed in the static mixer 9, and the thus-mixed paint proceeds, still under pressure from the pumps 13, into a discharge tube 10 and to the roller 7 for direct application to the workpiece. The remote roller applicator 17 includes a support arm 6 supports the roller 7 in place during application. Preferably, the roller 7, discharge tube 10, and static mixer are each independently removable and/or disposable.

Figure 3:
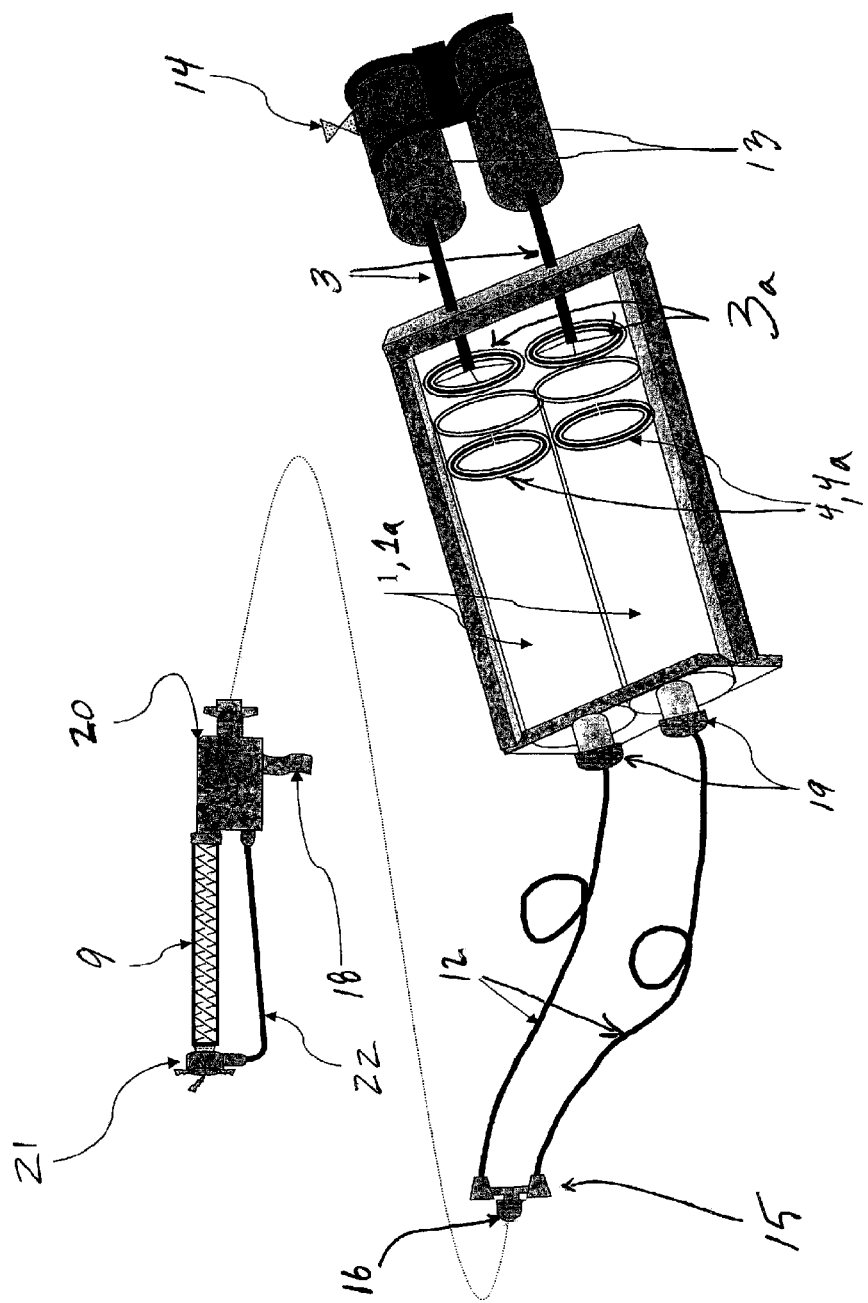
FIG. 3 shows the general parts of a preferred embodiment of the present invention.

One preferred embodiment is illustrated in FIG. 3, wherein pneumatic or hydraulic force to dispensing plugs for direct air assisted low pressure spray application of marine and industrial paints. The cartridges 1 and 1a are pressurized by pneumatic or hydraulic force via pumps 13, piston rods 3 and piston plates 3a, which apply continuous pressure on the cartridge piston seals 4, 4a, and the reactive components are pumped through hoses 12. Since each of the reactive components remains separate from the other in its hose there is no danger of curing and blocking the hoses 12, and thus the hoses 12 may have any length as appropriate for remote painting. The pneumatic or hydraulic pump 13 has an air regulator 14 that regulates the air pressure. Hoses 12 attach to the cartridges 1, 1 a by securing nuts 19 to individual dispensing apertures 11, which are illustrated in FIG. 2. The other end of the hoses 12 attach to a coupler 15, which attaches in turn to a handheld remote spray applicator gun 20. The remote spray applicator gun 20 has a trigger 18 that allows the operator to dispense the mixed paint on demand and as needed. The remote spray applicator gun 20 includes a disposable static mixer 9, and a spray tip 21 that uses regulated air for atomization of the mixed paint to spray-apply the paint to a substrate. The regulated air for ejecting and atomizing the mixed paint is supplied by a hose 22 that is attached to the spray tip 21 and is controlled by the operator when he or she pulls the trigger 18. In an alternative embodiment of the one described, a manual dispensing gun 2 is used to pump the reactive components from individual apertures through hoses 12 and on to the remote spray applicator gun.

One preferred spray tip 21 is available from V.O. Baker, Spray Tip Nozzle Manifold Part No. SPRYNZZL004-VOB. An angled spray tip 21 is preferred in view of reaching hard-to-access areas such as stiffeners near the hull of a ship. Such spray tips have an angle between the spray direction and the paint feed direction. Preferable angles range from 15 to 90 degrees and include 15, 25, 35, 45, 55, 60, 75, 85 and 90 degrees. The spray tip 21 may attach to the nozzle by any conventional fluid connection including Luhr-Lock, Bayonet, screw on, retaining nut, snap fit, friction fit, and the like. Friction fit is preferred.

In one embodiment of the invention, a flexible hose connects the spray tip 21 and the static mixer nozzle 9. In such an embodiment, the hose 22 remains attached to the spray tip 21, but is suitably lengthened to accommodate the length of the flexible hose between the spray tip 21 and the static mixer nozzle 9. In this embodiment, either a manual dispensing gun 2 or a pneumatic or hydraulic dispensing gun 38 may be used, and the remote spray applicator gun 20 may also be used. The operator may easily hold the spray tip 21, the flexible hose, and the hose 22 in one hand for paint application, and may initiate and control the liquid coating flow with the remote spray applicator gun 20 in the other. In this embodiment, the spray tip 21 may or may not be angled. This desirably allows the painter nearly complete freedom of movement, in contrast with bulky and awkward conventional application techniques. Heretofore, such freedom of movement and ability to spray apply was unknown. The flexible hose may have any length so long as the dwell time of the mixed paint in the flexible hose does not exceed the pot life. This flexible hose may be suitably disposable.

Figure 4:
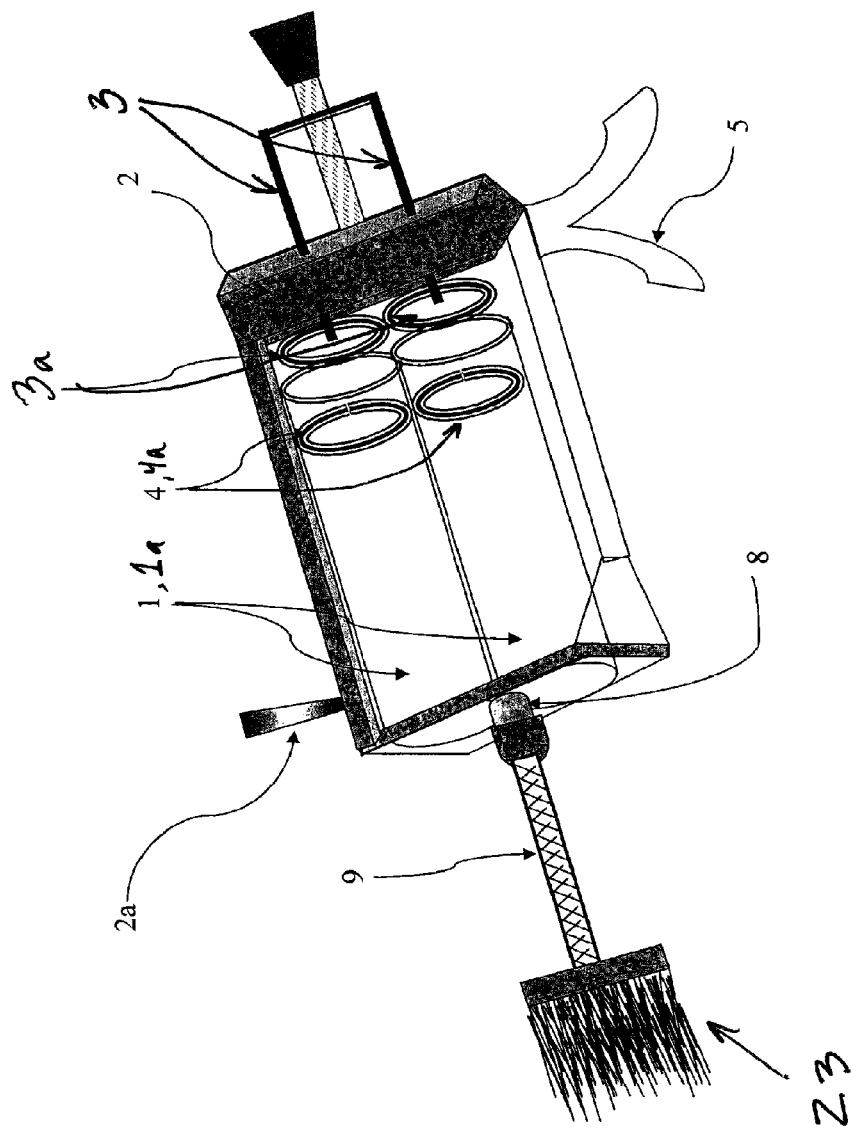
FIG. 4 shows the general parts of a preferred embodiment of the present invention.

FIG. 4 illustrates one preferred embodiment of the invention, which includes a manual dispensing gun 2, multi-component cartridges 1, 1a, a static mixer nozzle 9, and a brush applicator 23. The trigger 5 is squeezed by the operator, forcing the piston rods 3 and piston plates 3a and thus the piston cartridge seals 4 and 4a along the length of the cartridges 1, 1a. The reactive paint components are ejected through common discharge nozzle 8 into the static mixer 9, where they are thoroughly mixed. The thus-mixed paint is fed to the brush 23, where it may be brush-applied to the work surface. A support arm, similar to the support arm 6 shown in FIGS. 1 and 5, may be optionally attached to the dispensing gun 2 and the brush 23 to support the brush 23. Of course, the brush 23 and mixing nozzle 9 may be attached to a hydraulic or pneumatic pump 13 or a hand-held pneumatic or hydraulic dispensing gun 38 instead of the manual dispensing gun 2. In addition, the brush 23 and mixing nozzle 9 may be combined in a separate remote assembly similar to the remote spray applicator gun 20 connected by dual hoses 12 such as described herein.

The mixed paint may be applied from the static mixing nozzle onto an outer surface of the brush bristles, or the mixed paint may be applied to an interior portion of the brush bristles via one or more hollow passages leading from the outlet of the static mixing nozzle through the body of the brush 23 and into the interior part of the bristles. In the present context, either alternative is considered to be a fluid connection. The latter alternative, using one or more hollow passages through the brush 23, is preferred. The brush 23 and static mixing nozzle 9 are each independently removable and/or disposable.

Figure 5:
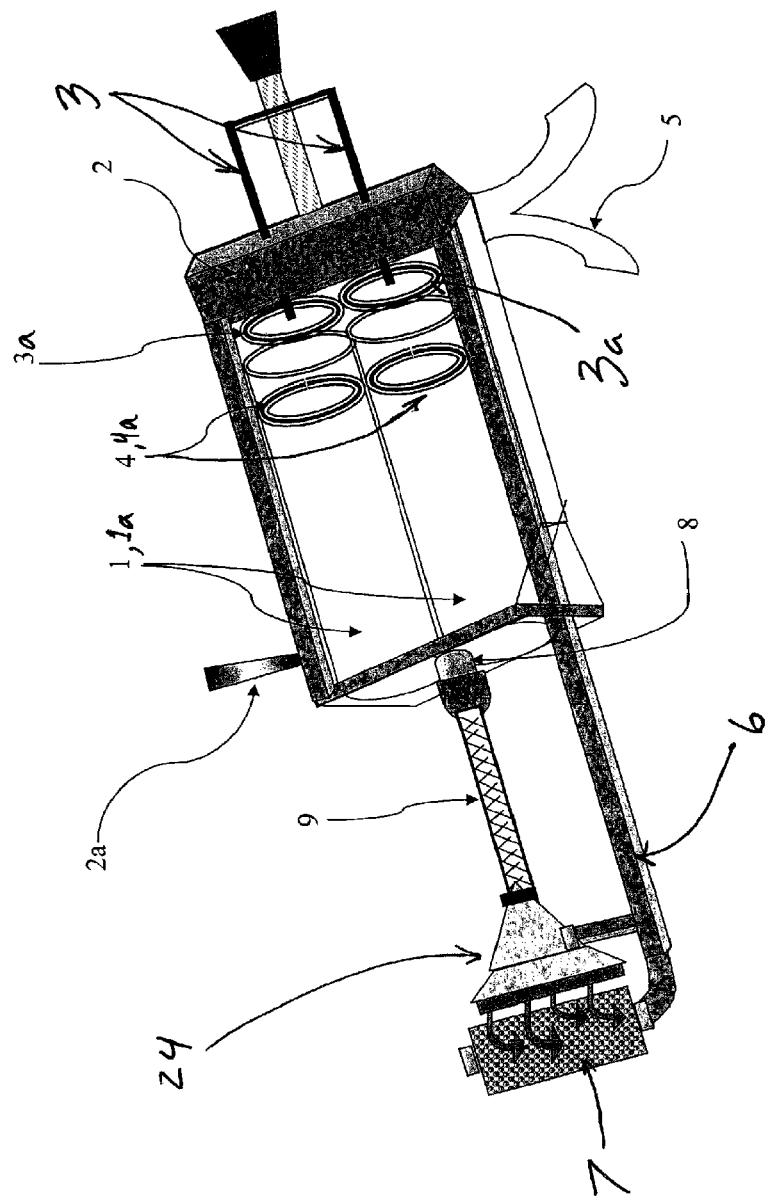
FIG. 5 shows the general parts of a preferred embodiment of the present invention.

FIG. 5 illustrates one preferred embodiment of the invention, which includes a manual dispensing gun 2, multi-component cartridges 1, 1a, a static mixer nozzle 9, a roller 7, and a roller coater 24. In this embodiment, the mixed paint emerging from the static mixer 9 is fed through the roller coater 24, which applies the mixed paint onto the exterior portion of the roller 7. The operator then rolls the paint onto the work surface with the roller 7. The roller coater 24 and roller 7 are stabilized and supported by the support arm 6. Of course, the roller coater 24 and roller 7 may be attached to a hydraulic or pneumatic pump 13 or a hand-held pneumatic or hydraulic dispensing gun 38 instead of the manual dispensing gun 2. In addition, the roller coater 24 and roller 7 and mixing nozzle 9 may be combined in a separate remote assembly similar to the remote brush applicator 17 connected by dual hoses 12 such as described herein.

In the context of the present invention, both the power roller type assembly using a perforated roller and the roller coater type assembly, such as described herein, are considered fluid connections. The former alternative, using the power roller assembly, is preferred.

Figure 6:
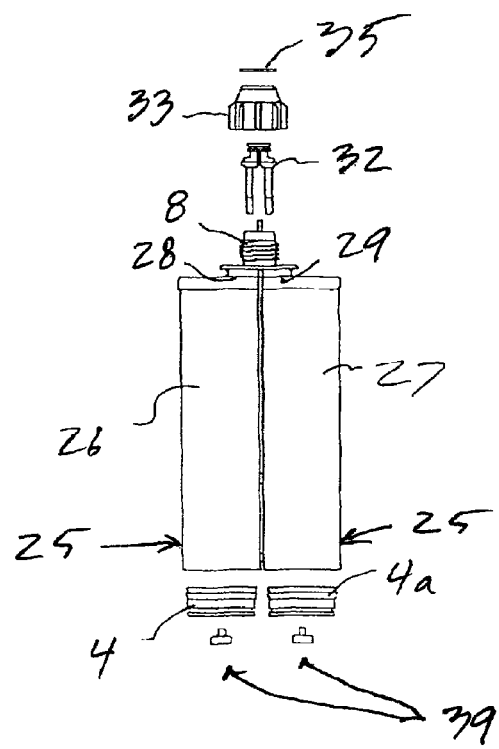
FIG. 6 shows the detail of a preferred embodiment of the present invention.
Figure 7:
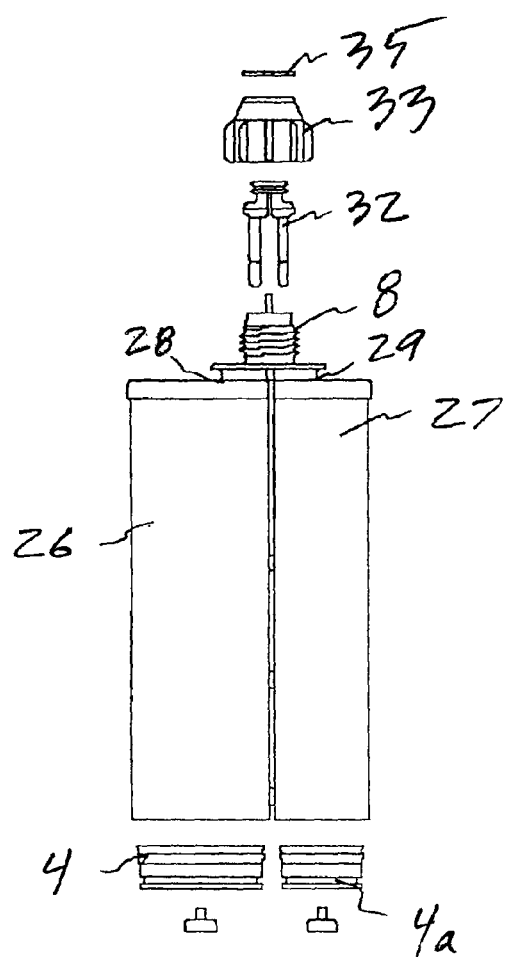
FIG. 7 shows the detail of a preferred embodiment of the present invention.
Figure 8:
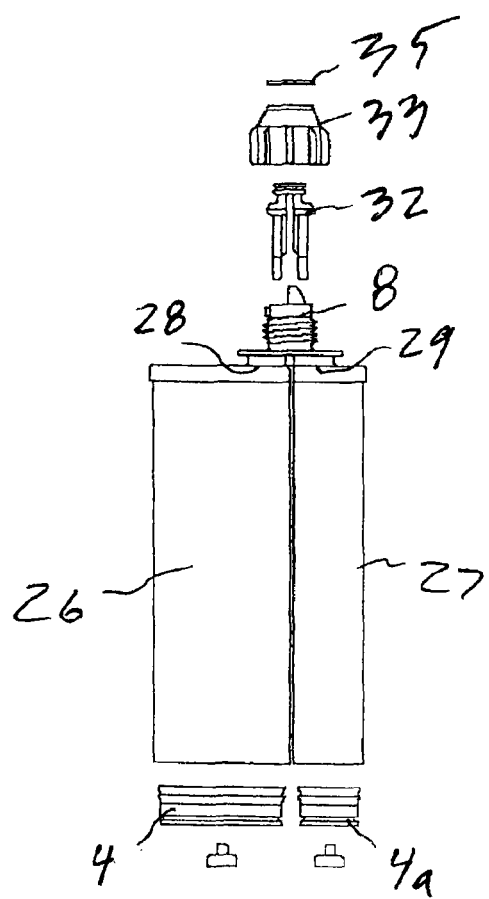
FIG. 8 shows the detail of a preferred embodiment of the present invention.

FIGS. 6, 7 and 8 illustrate preferred multi-component paint cartridges 1, 1a in more detail. Cartridges 1, 1a include parallel reservoirs 26 and 27 having cartridge piston seals 4 and 4a sealing one end of each, respectively. Apertures 28 and 29 are formed in ends of reservoirs 26 and 27, respectively, which oppose cartridge piston seals 4 and 4a. A discharge nozzle 8 is received in apertures 28 and 29, and closed by a nose plug 32 removably inserted therein. A retaining nut 33 threads onto discharge nozzle 8, holding plug 32 in position. Nut 33 is sealed by a disk 35. The reactive paint components in reservoirs 26 and 27 are mixed in specific ratios according to the respective reservoir volumes and cross sectional areas to provide a curable paint composition. Depending upon the material employed, various ratios are required. FIG. 6 illustrates a preferred multi-component paint cartridge with reservoirs 26 and 27 having a 1:1 ratio. FIG. 7 illustrates a preferred multi-component paint cartridge with reservoirs 26 and 27 having a 2:1 ratio, FIG. 8 illustrates a preferred multi-component paint cartridge with reservoirs 26 and 27 having a 4:1 ratio. One skilled in the art will understand that reservoirs 26 and 27 can be fabricated in various sizes to accommodate the necessary ratio of reactive components.

Figure 9:
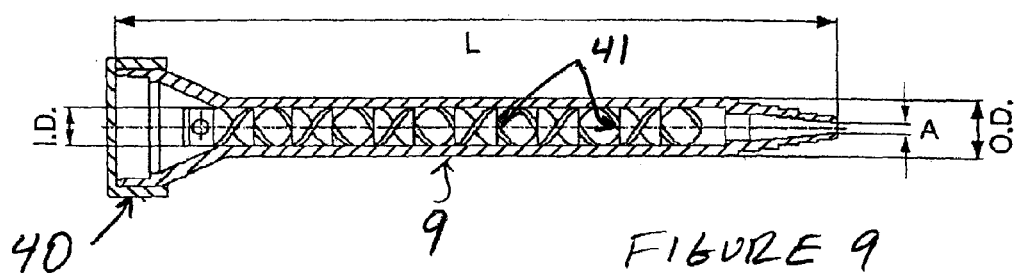
FIG. 9 shows the detail of a preferred embodiment of the present invention.

FIG. 9 illustrates the cross-section of a preferred static mixer 9 with cap 40. Mixing elements 41 are shown. The terms, I.D., O.D., A, and L represent inner dimension of the main tube, outer dimension of the main tube, outlet inner dimension and length, respectively.

Figure 10:
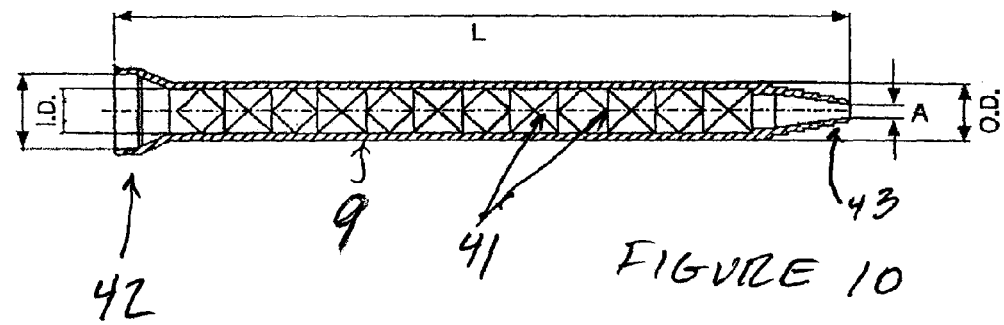
FIG. 10 shows the detail of a preferred embodiment of the present invention.

FIG. 10 illustrates the cross section of a preferred static mixer 9 without cap 40. Mixing elements 41 are shown. The inlet 42 is at the upstream side relative to fluid flow, and receives the reactive components. The reactive components contact and are mixed by the elements as the components traverse the length of the mixer 9, until they exit in the mixed paint form from the outlet 43 at the downstream end of the static mixer 9.

Figure 11:
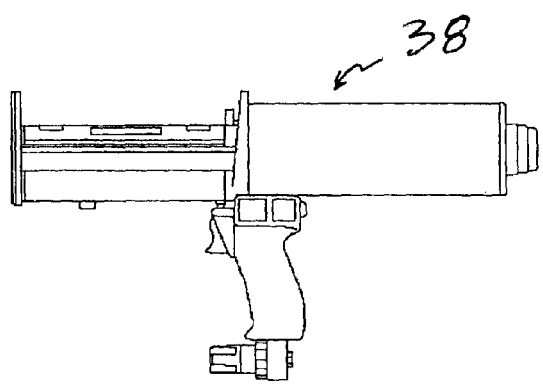
FIG. 11 shows a preferred embodiment of the present invention.
Figure 12:
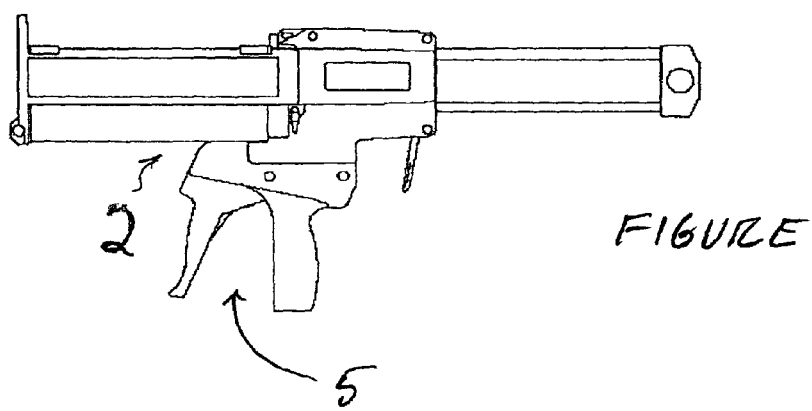
FIG. 12 shows a preferred embodiment of the present invention.

In operation, removal disc 35 and nose plug 32 are removed, providing an unobstructed passage for the reactive components from reservoirs 26 and 27 though apertures 28 and 29 and discharge nozzle 8. The static mixer nozzle is attached to the discharge nozzle 8. The reactive paint components are forced from reservoirs 26 and 27 and through apertures 28 and 29 by the movement of cartridge piston seals 4 and 4a, which are sealingly and slidably disposed within the reservoirs 26 and 27. The ejection of the components is accomplished by the use of a pneumatic or hydraulic dispensing gun 38 or a manual dispensing gun 2. FIGS. 11 and 12 show other embodiments of pneumatic or hydraulic and manual dispensing guns, respectively. The dispensing gun depresses cartridge piston seals 4 and 4a with piston rods 3 equally to eject the correct proportions of each reactive paint component.

The piston plug 39 sometimes known as a bleeding pin or a burping pin is optionally present in the cartridge piston seals 4, 4a and is useful when bleeding gas or air out of the reservoirs 26 and 27 when they are filled with reactive component liquids such as paint, resin, or catalyst, for example.

The multi-component cartridge 1 and 1a is not particularly limiting. Suitable cartridges are described, for example, in U.S. Pat. No. 5,249,709. Other suitable cartridges may be obtained commercially from Plas-Pak Industries, Norwich Conn. The cartridges 1 and 1a may either have a side-by-side construction, or a cartridge-within-a-cartridge construction. Examples of the latter are disclosed in, e.g., U.S. Pat. No. 5,310,091.

The respective cartridges 1 and 1a may have a permanent connection between them, or they may be separable, for example by one or more snap or similar connections. In one embodiment, the cartridges 1 and 1a are connected to one another by a snap connection near the common discharge nozzle 8. The cartridges 1 and 1a may be made of any suitable material, such as polyethylene or nylon. Nylon is preferred. Individual reservoir 26 and 27 volumes in the cartridges 1 and 1a may each independently range from 50 to 3000 ml, which range includes 50, 75, 100, 150, 250, 500, 750, 1000, 1250, 1500, 1750, 2000, 2250, 2500, 2750, and 3000 ml, and any combination thereof.

The reservoirs 26 and 27 in the cartridges may each independently have any suitable cross sectional area, in accordance with the formulation requirements of the reactive components. The cross sectional area ratio may range from 1:1 to 1:20, which range includes 1:1, 2, 3, 4, 5, 6, 7, 8, 9, 10, 11, 12, 13, 14, 15, 16, 17, 18, 19, and 20 as appropriate. Ratios of 1:1, 1:2, 1:4 are preferred.

The present invention is particularly useful for applying liquid coatings such as reactive two-component solvent-based coatings, edge-retention coatings, anti-corrosive coatings, high-solids coatings, low VOC coatings, Chemical Agent Resistant Coatings (C.A.R.C. paints), non-skid coatings, and the like, including but not limited to topcoat and/or primer coatings of polyurea, polyaspartic, epoxy, acrylic, silicone, polyester, polyurethane, polyamide, bisphenol A epoxy, bisphenol F epoxy, epoxy-polyamide, epoxy-polyamine, epoxy-ketamine, non-skid, aggregate-containing, aluminum oxide-containing, silica-containing, and the like.

These coatings are suitable in a variety of marine, military, off shore, petrochemical, automotive, transportation, rail, aerospace, and industrial applications. Other suitable application examples include without limitation ship construction and repair of tanks, ship structure, weapon systems, military transport vehicles, weapons, missiles, rail car repair, industrial transpiration equipments, pleasure craft and commercial ship construction and repair, aerospace systems, off shore platforms and markings, airplane maintenance, facilities and structures, industrial machinery and equipments, lawn and garden equipments, rigid container and closure coatings, and food processing equipment coatings. Marine and military applications are preferred.

The coating compositions are supplied as two or more separate components, usually referred to as the base and the curing agent. When these components are mixed, immediately before use, a chemical reaction occurs. These materials therefore have a limited 'pot life' before which the mixed coating must be applied. The polymerization reaction continues after the paint has been applied and after the solvent has evaporated to produce a densely cross linked film which can be very hard and has good solvent, mechanical, and chemical resistance. There are also chemically resistant paints often referred to as blast primers, shop primers, temporary primers, holding primers, and the like. These types of primers are more preferably used on structural steelwork, immediately after blast cleaning, to maintain the reactive blast cleaned surface in a rust free condition until final painting can be undertaken.

The reactive components, for example, resin and catalyst, or base and curing agent as more commonly referred to, may be formulated in proportions known to those of skill in the art. Preferred coatings include bisphenol A epoxies and bisphenol F epoxies, with one or more polyamide, polyamine, and ketamine being preferred as catalyst. Preferred curing agent: base ratios range from 1:1 to 1:20, with 1:1, 1:2, 1:3 and 1:4 being preferred.

High-solids, low solvent or low VOC coating compositions have solids content approaching 100% by weight of the coating. The solids content ranges from more than 80% to 100% by weight, which includes 85, 90, 91, 92, 93, 94, 95, 96, 97, 98, 99, 99.5, less than 100, and 100% by weight. The VOC or solvent content approaches zero, ranging from typically less than 20% by volume to zero percent, which includes 19, 17, 15, 13, 11, 10, 9, 8, 7, 6, 5, 4, 3, 2, 1, 0.5, greater than zero, and zero percent by volume. Coatings having zero to 6% VOC's by volume are preferred. Coatings having 94 to 100% solids by weight are preferred.

The present invention is also suitable for high-VOC coatings, having solvent contents of 50 to 94% solids by weight. This range includes 50, 55, 60, 62, 64, 66, 68, 70, 75, 80, 85, 90, and 94% solids by weight. These types of coatings are particularly suited for application to antennas, specialty coatings, and the like. A preferred example of such high-VOC liquid coatings is MIL-DTL-24441.

The preferred coating compositions have short pot lives upon mixing the reactive components, ranging from 3 hours or less to 0.25 hours, which range includes 2.75, 2.5, 2.25, 2, 1.75, 1.5, 1.25, 1, 0.75, 0.5, and 0.25 hours.

One or more than one coat may be applied. The coating compositions may contain one or more pigments, inhibitive agents and/or pigments, and non-inhibitive agents and/or pigments, microballoons, and the like.

One embodiment of the present invention provides a method of applying a non-skid coating composition, which includes applying to a surface an epoxy composition that contains an aggregate, such as aluminum oxide or silica, with the paint dispensing system described herein. In this embodiment, one of the cartridges 1 and 1a contains a hardener, and the other contains an epoxy resin and the aggregate. The reactive hardener and epoxy resin with the aggregate are combined and mixed in the static mixer nozzle 9, and applied. A desirably tough non-skid surface results.

In another embodiment of the invention, a one component composition is applied using the paint dispensing system described herein. In this embodiment, a reactive two component paint is not used, and instead a one-component composition is contained in both cartridges. This embodiment provides the ability to produces a superior conventional coating from a convenient packaging system, and reduces waste and cleanup.

One embodiment of the invention includes a cartridge 1, 1a that optionally has hermetically sealed dispensing and/or filling ends to prevent marine and industrial paints from leaking during handling, shipping and storage. The hermetic seal may be foil, plastic, or a combination thereof. Preferably, the hermetic sealing material is chemical resistant and forms a gas and liquid tight seal on either or both of the filling ends 25 (after being filled with one reactive liquid of the multi-component coating, cartridge piston seals 4, 4a, inserted, and degassed through piston plugs 39) and the aperture end 28, 29 of the multi-component cartridges. The hermetic seals at the aperture end of the cartridge may complement or replace the removal disc 35 and nose plug 32 if desired.

Static mixing nozzles 9 are not particularly limited so long as they progressively divide and recombine to thoroughly mix the reactive components of the coating. As the reactive components traverse the length of the static mixing nozzle 9, the number of mixing "folds" experienced by the fluid may be calculated as 2, wherein n is the number of mixing elements present. Some examples of static mixing nozzles 9 are described, for example, in U.S. Pat. Nos. 4,850,705, 4,767,026, and 4,538,920. Suitable static mixers may also be obtained commercially from Plas-Pak Industries, Norwich Conn.; and V.O. Baker Co., Mentor Oreg. The size of the static mixing nozzles 9 may suitably range from ⅛" to 1½" or 1 to 25 mm as appropriate, which includes ⅛", 3/16", ¼", 5/16", ⅜", 7/16", ½", 9/16", ⅝", 11/16", ¾", 13/16", ⅞", 15/16", 1", 1¼", 1½" and any combination thereof. Preferably, a step-down static mixer is used, wherein the I.D. changes from ⅜" to ¼" as one nears the outlet. Such step-down static mixing nozzles are available from Plas-Pak Industries, Norwich Conn. The static mixing nozzle 9 may attach to the common discharge nozzle 8 on the cartridges 1 and 1a with any suitable connection such as screw threads, Luhr-lock, lock-on retainer nut, bayonet tip, snap fit, frictional fit, and the like.

The dispensing gun is not particularly limited so long as it is capable of applying sufficient force to the cartridge piston seals 4 and 4a to move the reactant components from their respective cartridges 1 and 1 a through the static mixing nozzle 9 and on to the applicator roller 7, sprayer 21, or brush 23. The dispensing gun may be of the manual type 2, or the pneumatic or hydraulic type 38. The manual type may apply force through a clutch bar, screw, ratchet or similar mechanism connected to the squeeze trigger and handle assembly 5. One suitable manual dispensing gun is the NEWBORN 530™, manufactured by Newborn Bros. Other suitable manual guns are described, for example, in U.S. Pat. No. 5,875,928. The pneumatic type of dispensing gun is preferably regulated and air driven. Preferred pneumatic systems include the HSS™ by Plas-Pak Industries, Norwich Conn. Both manual and pneumatic dispensing guns are available, for example from V.O. Baker Co., Mentor Ohio. Hydraulic dispensing systems may suitably operate at pressures on the order of 800 psi.

The roller attachment 7 preferably includes a perforated or bleed through roller core and/or cover. Non-limiting examples of suitable perforated roller covers are available, for example, from Hennes-Johnson Equipment Co., Prague Minn.; and Wagner Spray Tech Corporation, Minneapolis Minn. For the roller coater embodiment, any roller 7 suitable for the paint may be used, including perforated roller cores and covers.

One preferred embodiment of the present invention provides a system that packages marine, military, and industrial multi-component reactive liquid paints in cartridges for dispensing and direct rolling or spraying paints by manual, pneumatic, or hydraulic methods.

Another method of the present invention provides a method for applying a high-solids, low VOC marine or military paint, to a surface using a multi-component cartridge.

The current system is particularly suitable for use in dispensing and applying multi-component coating systems, marine and military paints. Just dispensing the components in the correct proportions is insufficient. When dispensed, the components must be mixed to activate the curing process. As stated previously, however, manual mixing has certain drawbacks. The present invention provides a means of storing, dispensing, mixing, and applying reactive multi-component paints at or near point of use, conveniently, safely and with significantly reduced waste and improved coating performance. In this manner any amount of paint can be prepared for use, from very small amounts to large amounts. This avoids waste and provides a system for providing just the right amount of prepared paint for the time available for application.

The present invention desirably reduces the problems encountered with multi-component, reactive and high-solids paints. These include the problems of hot potting, inaccurate proportioning, mixing, and human error. The present invention increases the ease of coating application for painters to apply coatings. In addition, because the coating reactants remain sealed until mixed and applied, it is safer for the painters as it reduces their exposure to often toxic reactants, such as curing catalysts, isocyanates, and the like. In addition, the present invention results in a more manageable process on an industrial scale, it drastically reduces paint can change out time, waste due to expired pot life and spillage, and clean-up solvent. The present invention is particularly suitable for marine and military paint multi-component paints.

In accordance with the present invention, preloaded disposable paint cartridges with disposable static mixers keep the base and hardener separate from one another as long as possible and allow dispensing of paint on demand. A preloaded disposable paint cartridge with disposable static mixer is used to mix the multi-component systems as close to the cartridge as possible. The use of preloaded disposable paint cartridges with disposable static mixers eliminates pot life problems and viscosity problems that result in waste and application difficulties.

Preloaded disposable military and marine paint cartridges with disposable static mixers reduce the problems encountered with viscosity and pot life by keeping the two components separate as long as possible. Keeping the reactive components of multi-component coatings separate eliminates the risk of the coatings curing before use. Components are mixed at the work site when needed. This not only reduces the amount mixed and waste generated, it improves product integrity by maintaining exact ratios, thereby allowing the end user to achieve maximum service life expectancy.

Military and marine coatings are much more sensitive than traditional solvent based epoxies and coatings. In the present application, marine and military paints are especially formulated to be used in a saltwater marine environment and/or are specified by the U.S. military, such as the U.S Army, Navy, Marine Corps, Air Force, Military Sealift Command, and/or Coast Guard. These coatings must be mixed properly and thoroughly according to manufacturers specifications in order to cure. High solids coatings, and particularly those for marine and military applications, have specific mix ratios with very tight tolerances, generally plus or minus 3%. There are many different factors that affect whether a coating will be on or off ratio. In accordance with the present invention, preloaded disposable military and marine paint cartridges with disposable static mixers assures the mix ratios are maintained when dispensing. In accordance with one embodiment of the present invention, these dispensing systems are combined with a paint roller or brushing apparatus and method. In accordance with another embodiment of the present invention, a multi-component cartridge preloaded with one or more reactive components of a high solids, low VOC marine and military paint.

The entire contents of each of the references, patents, and patent applications cited herein is hereby incorporated by reference, the same as if set forth at length.

Obviously, numerous modifications and variations of the present invention are possible in light of the above teachings. It is therefore understood that within the scope of the appended claims, the invention may be practiced otherwise than as specifically recited herein.

What is claimed is:

1. A device for applying a spray coating, comprising:
   first and second component reservoirs, the first component reservoir configured to receive a first component and the second component reservoir configured to receive a second component;
   a component applicator comprising a spray tip and an applicator device, the spray tip being configured to use regulated air to apply the mixed component;
   a static mixing nozzle in fluid communication with the component reservoirs and configured to mix the first and second components into a mixed component, the static mixing nozzle having a first portion connected to the spray tip to be in fluid communication with the spray tip and a second portion connected to the applicator device, a majority of the static mixing nozzle not being encased in another housing so that the static mixing nozzle is at least one of disposable and detachable from the component applicator;
   a flexible hose having a first end and a second end, the first end of the flexible hose configured to be disposed adjacent the component reservoirs and the second end of the flexible hose configured to be disposed adjacent the static mixing nozzle so as to be disposed between and in fluid communication with the static mixing nozzle and at least one of the component reservoirs; and
   a trigger mechanism disposed on the component applicator, and configured to enable application of the mixed component.

2. The device of claim 1, wherein the first and second component reservoirs each includes a cylindrical cartridge.

3. A device for applying a spray coating, comprising:
   first and second component reservoirs, the first component reservoir configured to receive a first component and the second component reservoir configured to receive a second component;
   a static mixing nozzle in fluid communication with the component reservoirs, and configured to mix the first and second components into a mixed component;
   a component applicator comprising a spray tip in fluid communication with the static mixing nozzle, and the spray tip connected to the static mixing nozzle, and configured to use regulated air to apply the mixed component;
   a flexible hose having a first end and a second end, the first end of the flexible hose configured to be disposed adjacent the component reservoirs and the second end of the flexible hose configured to be disposed adjacent the static mixing nozzle so as to be disposed between and in fluid communication with the static mixing nozzle and at least one of the component reservoirs; and
   a trigger mechanism disposed on the component applicator, and configured to enable application of the mixed component,
   the first and second component reservoirs each comprises an open filling end that is disposed opposite an aperture in fluid communication with a discharge nozzle, and that is slidingly sealed by a cartridge piston seal.

4. The device of claim 1, wherein the first and second component reservoirs have respective cross sectional volumes that are proportional to a predetermined mixing ratio.

5. The device of claim 1, further comprising a manual, pneumatic, or hydraulic dispensing gun, in contact with each of the first and second component reservoirs.

6. The device of claim 1, wherein the static mixing nozzle and the spray tip are contained within a remote spray applicator gun.

7. A device for applying a spray coating, comprising:
   first and second component reservoirs, each component reservoir of the first and second component reservoirs including an aperture;
   a component applicator comprising a spray tip and an applicator device, the spray tip being configured to use regulated air to apply a mixed component;
   a static mixing nozzle in fluid communication with each of the apertures of the first and second component reservoirs, the static mixing nozzle having a first portion connected to the spray tip to be in fluid communication with the spray tip and a second portion connected to the applicator device, a majority of the static mixing nozzle not being encased in another housing so that the static mixing nozzle is at least one of disposable and detachable from the component applicator;
   a flexible hose disposed between and in fluid communication with the static mixing nozzle and at least one of the component reservoirs; and
   a trigger mechanism disposed on the component applicator, and configured to enable selective application of the mixed component.

8. The device of claim 7, wherein each of the first and second component reservoirs comprises a cylindrical cartridge.

9. The device of claim 7, wherein each aperture is in fluid communication with a common discharge nozzle, and the common discharge nozzle is in fluid communication with the static mixing nozzle.

10. The device of claim 7, wherein the first and second component reservoirs have respective cross sectional volumes that are proportional to a predetermined mixing ratio.

11. The device of claim 7, wherein the first reservoir and the second reservoir have a ratio of a cross sectional area of the first reservoir to a cross sectional area of the second reservoir that ranges from 1:1 to 1:20.

12. The device of claim 7, wherein the static mixing nozzle is disposed on the component applicator.

13. The device of claim 7, wherein the static mixing nozzle includes a plurality of mixing elements configured to mix the first and second components to form the mixed component.

14. The device of claim 7, further comprising
a line configured to connect to the spray tip to supply the regulated air for ejecting and atomizing the mixed component.
15. The device of claim 14, wherein
the trigger mechanism is configured to control the regulated air through the line.
16. The device of claim 7, wherein
the flexible hose is a first flexible hose of a plurality of flexible hoses, and a second flexible hose of the plurality of flexible hoses is disposed between and in fluid communication with the static mixing nozzle and at least one of the component reservoirs.
17. The device of claim 1, wherein
the static mixing nozzle is disposed on the component applicator.
18. The device of claim 1, wherein
the static mixing nozzle includes a plurality of mixing elements configured to mix the first and second components.
19. The device of claim 1, further comprising
a line configured to connect to the spray tip to supply the regulated air for ejecting and atomizing the mixed component.
20. The device of claim 19, wherein
the trigger mechanism is configured to control the regulated air through the line.
21. The device of claim 1, wherein
the flexible hose is a first flexible hose of a plurality of flexible hoses, and a second flexible hose of the plurality of flexible hoses has a first end and a second end, the first end of the second flexible hose configured to be disposed adjacent the component reservoirs and the second end of the second flexible hose configured to be disposed adjacent the static mixing nozzle so as to be disposed between and in fluid communication with the static mixing nozzle and the component reservoirs.

* * * * *